W. H. MILLER.
VEHICLE HEATER.
APPLICATION FILED JAN. 5, 1916.
1,217,110.
Patented Feb. 20, 1917.
2 SHEETS—SHEET 1.
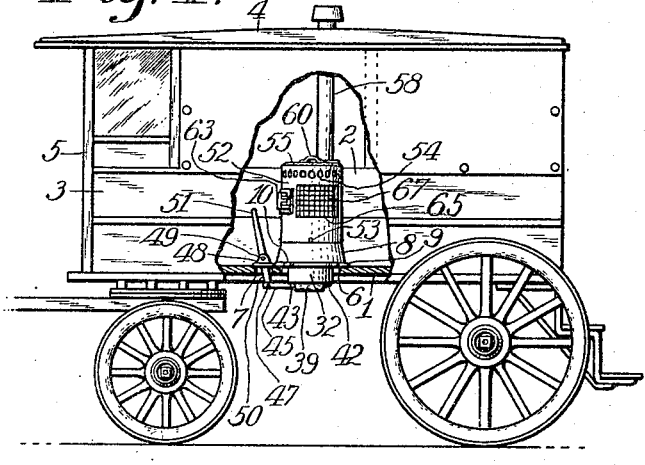
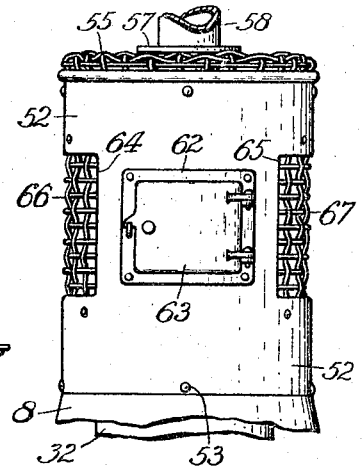
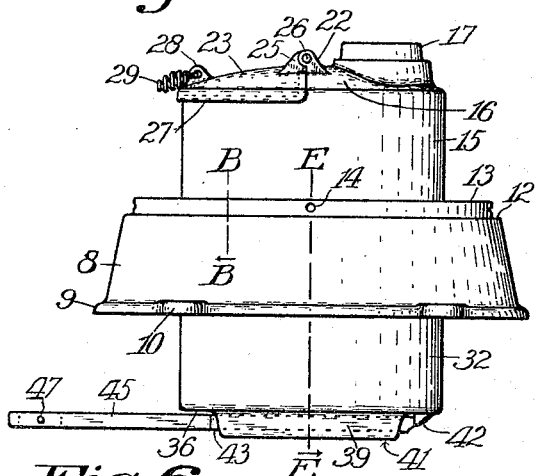
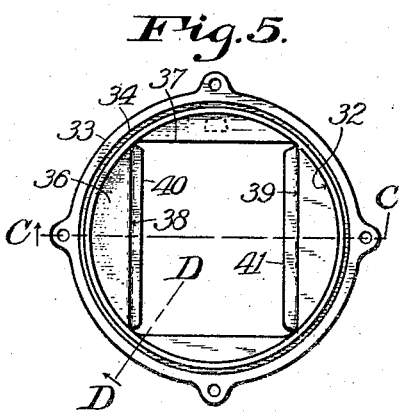
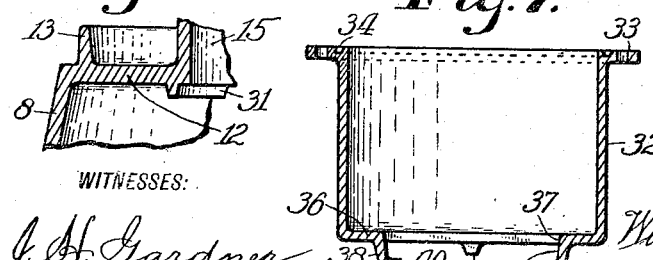
WITNESSES:
J. H. Gardner
M. E. Sparrow
INVENTOR:
William H. Miller,
BY
E. F. Silvius,
ATTORNEY.

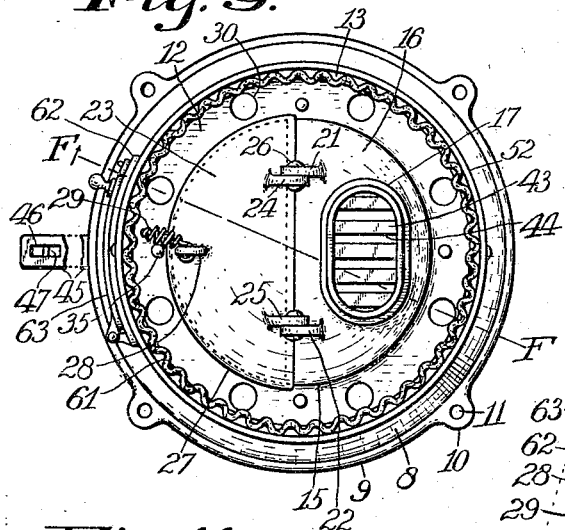

UNITED STATES PATENT OFFICE.

WILLIAM H. MILLER, OF CRAWFORDSVILLE, INDIANA, ASSIGNOR TO MILLER VEHICLE HEATER COMPANY, OF CRAWFORDSVILLE, INDIANA, A CORPORATION OF INDIANA.

VEHICLE-HEATER.

1,217,110. Specification of Letters Patent. Patented Feb. 20, 1917.

Application filed January 5, 1916. Serial No. 70,366.

*To all whom it may concern:*

Be it known that I, WILLIAM H. MILLER, a citizen of the United States, residing at Crawfordsville, in the county of Montgomery and State of Indiana, have invented a new and useful Vehicle-Heater, of which the following is a specification, reference being had to the accompanying drawings, and to the letters and figures of reference marked thereon.

This invention relates to the heating of vehicles and especially such as are designed to be used in rural districts or for long periods in a cold climate, the invention having reference more particularly to means for supplying directly radiated heat and also heated air to the vehicle body.

An object of the invention is to provide a heater of improved and simple construction, particularly in small sizes so as to be suitable for heating a single chamber or vehicle body, and which may be produced inexpensively. Another object is to provide conveyances, such as omnibuses, for conveying pupils to or from school, or rural postal wagons, with a heater of simple construction which may be easily and simply operated safely and be durable and economical in use.

With the above-mentioned and other objects in view, the invention consists in a safety heater of such construction as to be adapted to be connected with the floor of a vehicle body and be operated without exposing the occupants thereof to danger of being burned, particularly by live coals or ashes; the invention consisting further in providing a vehicle body with a heater so constructed and arranged that the main portion of the heater shall be above the floor and the lower portion of the fire-pot of the heater under the floor of the vehicle body. Also the invention consists further in the novel parts, and combinations and arrangements of parts, as hereinafter particularly described and further defined in the accompanying claims.

Referring to the drawings, Figure 1 is a side elevation of a road vehicle partially broken away to expose the improved heater with which the vehicle body is provided; Fig. 2 is a front elevation of the heater slightly modified and partly broken away; Fig. 3 is a side elevation of the more substantial portion of the heater including the furnace or fire-box thereof; Fig. 4 is a transverse section of the furnace grate of the heater; Fig. 5 is a top plan of the improved fire-pot; Fig. 6 is a fragmentary section on the line B B on Fig. 3 on an enlarged scale; Fig. 7 is a section of the fire-pot on the line C C on Fig. 5; Fig. 8 is a fragmentary section on the line D D on Fig. 5; Fig. 9 is a top plan of the heater minus its top guard and its draft pipe; Fig. 10 is a vertical central section of the complete heater and fragments of the vehicle floor or bottom; Fig. 11 is a top plan of the top guard of the heater; Fig. 12 is a fragmentary section on the line E E on Fig. 3; and, Fig. 13 is a fragmentary section of the base portion of the heater on the plane of the line F F on Fig. 9.

On the various figures of the drawings, like reference characters indicate like parts or features of construction herein referred to.

A vehicle body to which the invention is peculiarly adapted comprises a floor 1, sides 2 and 3 and a roof 4, a driver's position 5 being in the forward end of the body. A convenient position for the heater is determined upon and at such position the floor 1 has an aperture 6 therein of suitable diameter to receive and afford ample clearance for the fire-pot of the heater, the floor having a relatively small slot 7 therein at a suitable distance from the aperture.

The heater has a base comprising an annular wall 8 which preferably is slightly conical and has a flange 9 on its bottom provided with securing ears 10 having each a bolt hole 11 therein for securing the base to the vehicle floor, the base being placed upon the floor so as to cover the aperture 6. The base comprises also a ledge 12 that extends inward from the top of the wall. The ledge has a relatively low annular wall 13 thereon that is slightly less in diameter than the upper portion of the wall 8 and has bolt holes 14 therein. An annular furnace or fire-box wall 15 is connected to the inner edge portion of the ledge and has a crowning top portion 16 thereon that covers approximately one-half of the top of the furnace wall. The top portion has a draft opening therein provided with a collar 17 with which to connect a draft pipe. The top portion has a joint edge 18 provided with a lip 19, forward of which the top 20 of the furnace wall forms a doorway for the insertion of fuel. The top portion 16 is provided adjacent to the edge 18 with hinge ears 21 and 22. A door or lid 23 is provided which normally rests on the lip 19 and the top portion 2 and has hinge ears 24 and 25 that are connected to the first-mentioned ears by means of a hinge pin 26. The door or lid 23 has a flange 27 thereon that extends downward over the exterior of the top portion 20 of the furnace wall and is provided also with an ear 28 having a handle 29 connected thereto for manipulating the door. The ledge 12 has a suitable number of apertures 30 therein between the wall 13 and the wall 15 for the passage of heated air. The under side of the ledge below the furnace wall 15 has a joint rib or tongue 31 thereon. The improved furnace comprises also a fire-pot consisting of a cylindrical wall 32 that has an external flange 33 on its upper portion, the top of the wall or flange having a groove 34 therein that receives the tongue 31, the flange being secured to the ledge 12 by means of bolts 35. The fire-pot has a bottom 36 in which is a central aperture 37. The bottom has two grate guides 38 and 39 that extend down from opposite sides respectively of the aperture, the guides being provided with supporting ledges 40 and 41 respectively that extend each toward the other to support and guide a furnace grate. The under side of the bottom 36 is provided also with a stop projection 42 for the grate. The grate comprises a plate 43 having a suitable number of slots 44 therein, the plate being slidingly supported upon the ledges 40 and 41 and having an arm 45 on one end thereof that has a slot 46 therein, the arm preferably being provided with a pivot 47 in the slot. The heater may be set so that the arm 45 extends forward, the slot 7 in the bottom 1 being forward of the aperture 6. A fulcrum block 48 is mounted on the floor 1 and is provided with a pivot pin 49 to which a shaker lever is connected between its ends so as to have an arm 50 that extends downward through the slot 7 and into the slot 46, being preferably connected to the pivot 47, the lever having an upwardly extending arm 51 which preferably is near to the driver's seat so that it may conveniently be reached by the driver of the vehicle. The heater base and the fire-box wall with its top portion preferably are formed as a single casting.

A sheet metal radiator body 52 is provided which is cylindrical and supported upon the ledge 12 on the outer side of the wall 13, being secured to the latter by means of bolts 53, the radiator wall being sufficiently far from the furnace so as to not become excessively hot. The upper portion of the radiator wall preferably has a suitable number of apertures 54 therein for the escape of heated air, the air being permitted to escape also from the top of the radiator which, however, is provided with a guard 55 composed of wire netting and having a flange 56 thereon that is removably inserted in the upper end of the radiator so as to afford a rest upon which a person may warm his hands, the guard preventing children from throwing trash onto the top of the furnace. The guard 55 has a suitable opening preferably provided with a collar 57 through which a draft pipe 58 extends, the latter being connected to the collar 17 of the furnace. The top of the guard 55 is preferably provided with handles 59 and 60 for lifting it from the radiator. The radiator 52 is provided with a suitable lining 61, preferably composed of asbestos of sheet form and vertically corrugated, in order to prevent the metallic radiator wall from becoming so hot as to cause burns in case the occupants of the vehicle come into contact therewith.

As preferably constructed, the front portion of the radiator body or wall 52 is provided with a door frame 62 on which a front door 63 is mounted so that it may be opened to gain access conveniently to the door or lid 23, the door frame being on a plane slightly higher than the door 23, such provision being desirable when the radiator is very tall relatively to the furnace, but may be omitted when the radiator is of such small size as to permit the door 23 to be conveniently reached from the top of the radiator. Also, the body or wall 52 preferably has openings 64 and 65 in opposite portions respectively thereof in which reticulate panels 66 and 67 are, respectively secured, the lining 61 having corresponding openings therein, so that heated air may pass through the radiator wall while protection is afforded to persons against coming into contact with the furnace; in such case the wall 52 requiring no apertures 54 which, in some cases, however, may be desired. The panels may suitably be composed of woven wire.

It should be understood that, within the scope of the appended claims, various modifications are contemplated and may fairly be made without departing from the spirit and intent of the invention.

In practical use, after opening the door or lid 23 of the furnace, either through the front door 63 or the top of the radiator, a fire is kindled upon the furnace grate, any convenient fuel being used, preferably charcoal. Sufficient air to support combustion will pass through the slots 44, the fumes and smoke, if any, passing out through the draft pipe 58. The lever arm 51 is manipulated to shake the ashes from the fire-pot when draft is required, and in some cases the grate may be moved forward sufficiently to permit accumulations of ashes to drop out behind the grate plate. Usually a sufficient quantity of ashes is retained on the grate to prevent the dropping of fire, it being designed to have only a slow burning fire requiring only a moderate amount of air. When the fire-pot becomes heated the air passing around it and upward through the apertures 30 to the interior of the radiator becomes heated in passing and is further heated in the radiator before escaping from the upper portion thereof or through the openings 64 and 65 into the vehicle body or compartment, the air thus supplied for heating being fresh from the atmosphere and conducive to the health of the occupants of the vehicle or compartment. When it is required to start a fire, or to replenish it with fuel, the front door 63 is opened, or the guard 55 is lifted from its normal position and slides up on the draft pipe 58. At a sufficient height the guard is released while slightly tilting it so that the collar 57 grips the draft pipe and holds the guard, the latter in some cases being turned back out of the way if preferred. The whole structure in some cases is conveniently small so that when the guard is removed from the top of the radiator the attendant may readily reach the handle 29 and lift the door or lid 23 for inserting fuel into the furnace.

Having thus described the invention, what is claimed as new is—

1. A heater including an annular base having an inwardly-extending apertured annular ledge, a furnace connected to the ledge and extending upward and also downward therefrom, the lower portion of the furnace being provided with a fire-grate, the top portion of the furnace having a draft-opening, a hollow cylindrical radiator secured to the outer portion of the base and extending about the upper portion of the furnace and upward beyond the plane of the top thereof, a guard connected to the top portion of the radiator, and a draft pipe connected with the draft-opening of the furnace top and extending through the guard.

2. A heater including a base comprising an annular side wall having an inwardly-extending apertured ledge on its upper portion, a furnace connected to the ledge and extending upward and also downward therefrom, the top portion of the furnace being provided with a door and a draft-opening, a fire-grate in the lower portion of the furnace, a hollow cylindrical radiator secured upon the outer portion of the base and extending about the upper portion of the furnace and upward beyond the plane of the top thereof, a reticulate guard connected to the top portion of the radiator and having an aperture therein above the said draft-opening, and a draft pipe extending through said aperture and connected with said draft-opening.

3. A heater including a base comprising a side wall having an inwardly-extending apertured ledge on its upper portion, a furnace connected to the ledge and extending upward and also downward therefrom, the lower portion of the furnace being beyond the plane of the bottom of the side wall and provided with a fire-grate, the top portion of the furnace being provided with a door and a draft-opening, a hollow cylindrical radiator secured to the outer portion of the base and extending about the upper portion of the furnace and upward beyond the plane of the top thereof, the upper portion of the radiator having apertures therein, a guard connected to the top portion of the radiator and covering the furnace, and a draft-pipe connected with said draft-opening and extending through the guard.

4. A heater including an annular base having an inwardly-extending apertured ledge, a furnace connected to the ledge and extending upward and also downward therefrom, the lower portion of the furnace being beyond the plane of the bottom of the base and provided with a fire-grate, the top portion of the furnace being provided with a door, a hollow cylindrical radiator secured upon the outer portion of the base and extending about the upper portion of the furnace and upward beyond the plane of the top thereof, the upper portion of the radiator having apertures therein, and a reticulate guard connected to the top portion of the radiator and covering the furnace.

5. In a heater, the combination of an annular base having an inwardly-extending apertured ledge, a hollow cylindrical radiator supported upon the outer portion of the base, the wall of the radiator having two apertures each provided with a guard and having also a door between the apertures, a reticulate guard connected with the top portion of the wall, a furnace connected to the ledge and extending upward and also downward therefrom, the top portion of the furnace having a horizontally arranged door hinged thereto, and a fire-grate mounted in the lower portion of the furnace.

6. In a heater, the combination with an annular base having an inwardly-extending apertured ledge, of a hollow cylindrical radiator supported upon the outer portion of the base, a furnace wall connected to the inner edge portion of the ledge and extending upward into the radiator and also downward beyond the plane of the bottom of the base, the lower end of the wall being provided with a grate, a top portion fixed on the top of the wall, a door on the top of the wall and hinged to said top portion, and a guard in the top of the radiator.

7. In a heater, the combination of a base, a hollow cylindrical radiator secured to the top portion of the base, the wall of the radiator having apertures provided with guards, a fire-box wall connected to the base and extending upward within the radiator, a fire-pot connected to the base and the bottom of the fire-box wall, a grate supported by the lower end of the fire-pot, a top connected to and covering a portion of the upper end of the fire-box wall, a draft pipe connected to said top and extending upward through the radiator, and a door hinged to said top and covering the remaining portion of the upper end of the fire-box wall.

8. In a heater, the combination with a base having an inwardly-extending apertured ledge, and a furnace connected to the inner edge portion of the ledge and extending upward therefrom, the top of the furnace having a flue-opening, of a hollow cylindrical radiator supported upon the base and extending about the upper portion of the furnace and upward beyond the plane of the top thereof, a draft pipe connected with said flue-opening and extending upward through the radiator, a lining on the inner side of the radiator, a reticulate guard having a flange removably connected with the top portion of the radiator and having an aperture receiving said pipe and provided with a collar, the collar extending loosely about the pipe to grip the latter when the guard is lifted and tilted, for supporting the guard, and handles secured to the top of said guard.

9. In a vehicle heater, the combination of a vehicle body comprising a floor and sides, the floor having an aperture and also a slot therein, a base secured upon the floor between the sides and extending about the aperture, the base having an inwardly-extending apertured ledge on its upper portion, a hollow cylindrical radiator supported uprightly upon the upper portion of the base, a furnace supported by said ledge and extending upward into the radiator and also downward through the base and through said aperture, a grate movably supported by the bottom portion of the furnace and having an operating-arm extending under said floor, a lever pivotally supported by said floor adjacent to and extending through said slot, the lever having one arm connected to said operating-arm and having also another arm extending upward from said floor, and a draft pipe connected to said furnace.

10. In a vehicle heater, the combination of a vehicle body comprising a floor and sides, the floor having an aperture and also a slot therein, the body having a driver's station adjacent to said slot, a base secured upon the floor between the sides and extending about the aperture, the base having an inwardly-extending apertured ledge thereon, a hollow cylindrical radiator uprightly supported upon the base, a furnace supported by the ledge and extending upward into the radiator and also downward through said aperture, the furnace having a top portion and also a door hinged to the top portion on its upper end, a reticulate guard removably connected to the top portion of the radiator and having an aperture therein, a draft pipe connected to said top portion of the furnace and extending through the radiator and through the aperture of said guard, a grate movably supported by the lower portion of said furnace, and a shaker lever pivotally mounted upon said floor and having an arm extending through said slot and connected with said grate, the lever having also an arm extending in proximity to said driver's station.

In testimony whereof, I affix my signature in presence of two witnesses.

WILLIAM H. MILLER.

Witnesses:
CHARLES M. McCABE,
JUSTIN J. MALONY.

Copies of this patent may be obtained for five cents each, by addressing the "Commissioner of Patents, Washington, D. C."